J. SCHIESSLER.
SUBMARINE SIGNALING APPARATUS.
APPLICATION FILED FEB. 8, 1908.

1,204,826.

Patented Nov. 14, 1916.
4 SHEETS—SHEET 1.

Witnesses.
Jesse K. Lutton
B. W. Dommers

Inventor.
Josef Schiessler

J. SCHIESSLER.
SUBMARINE SIGNALING APPARATUS.
APPLICATION FILED FEB. 8, 1908.

1,204,826.

Patented Nov. 14, 1916.
4 SHEETS—SHEET 2.

Witnesses
M. J. L. Higgins.
May Ellis

Inventor
Josef Schiessler
by Henry Orth
Atty

J. SCHIESSLER.
SUBMARINE SIGNALING APPARATUS.
APPLICATION FILED FEB. 8, 1908.

1,204,826.

Patented Nov. 14, 1916.
4 SHEETS—SHEET 3.

Witnesses.
Jesse N. Lutton
B. V. Sommers

Inventor.
Josef Schiessler
by Henry Ortlieb
Atty.

UNITED STATES PATENT OFFICE.

JOSEF SCHIESSLER, OF BADEN, NEAR VIENNA, AUSTRIA-HUNGARY.

SUBMARINE SIGNALING APPARATUS.

1,204,826.   Specification of Letters Patent.   Patented Nov. 14, 1916.

Application filed February 8, 1908.   Serial No. 414,998.

*To all whom it may concern:*

Be it known that I, JOSEF SCHIESSLER, a subject of the Emperor of Austria-Hungary, residing at Baden, near Vienna, Austria-Hungary, have invented certain new and useful Improvements in Submarine Signaling Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The object of the invention is to provide a new or improved submarine signaling apparatus, the purpose of which is—1. To determine the position of a submarine source of sound according to the indications on a mariner's compass card, as well as to also determine the distance of such source of sound from the place of observation and to immediately transmit the indication or intimation to various other places. 2. To determine the speed at which a source of sound approaches toward or recedes from the place of observation. 3. To enable signals or spoken sounds to be transmitted under water. The apparatus being such that in such operations the manipulations necessary to be effected by hand are reduced to a minimum. For this purpose there is arranged at the place of observation, such as a ship, lighthouse, etc., a receiver provided with a movable sound seeker which is placed under water and which converts sound waves entering or caught up by it into corresponding electrical waves that first set up mechanical oscillations in the membrane, diaphragm, or the like, suitably arranged to receive them. By means of an optical arrangement and a body the conductivity of which varies under the action of light, such for example as selenium, these mechanical oscillations control an electric signaling circuit, or the operations of an acoustic signal. At the same time the electrical waves produced by the sound waves entering the apparatus are again converted into sound waves by a telephonic arrangement, the air waves thereby produced being adapted to act, if necessary, upon a device whereby the pitch of such waves, or the number of oscillations corresponding to such pitch, can be determined. In order, however, should it be desired to do so, to transmit sound waves corresponding to a certain pitch, or spoken sound agreed upon in the service, the apparatus may include a transmitter capable of adjustment in any desired direction, and which is adapted to impress upon the water the sound waves produced either by a sound producer, such as a siren or the like, or by spoken sounds, so that such sound waves may be picked up by a receiver of the kind hereinbefore referred to.

A construction of submarine signaling apparatus embodying this invention is illustrated in the accompanying drawings—

Fig. 1$^a$ is a view, partly in section, of a modified arrangement of the sound seeker provided with a solid receiving cylinder. Fig. 1$^b$ is a sectional view of the contact device similar to Ampère's frames.

Figure 1:
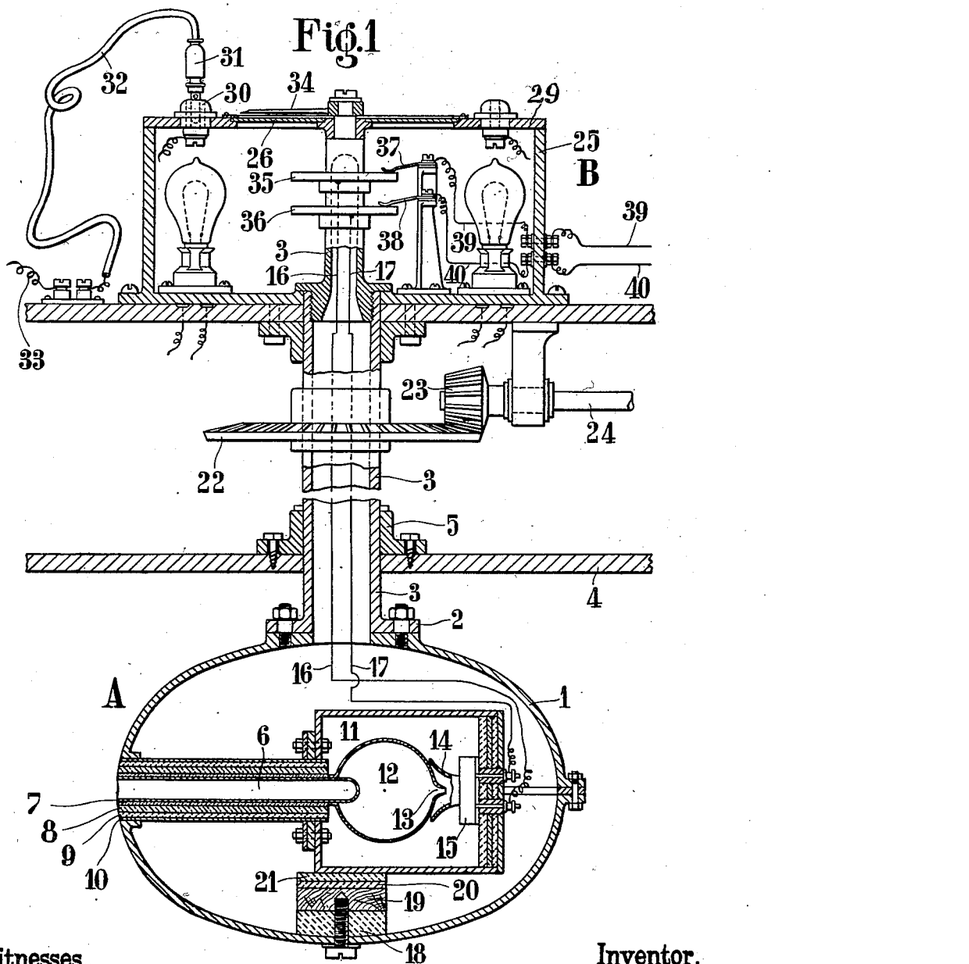
Figure 1 shows in central vertical section the receiver placed under water in combination with the indicating apparatus arranged above the water upon a ship, lighthouse, or other position.

A indicates the receiving apparatus, comprising a sound seeker 1 adapted to be placed under water and capable of being rotated about a vertical axis. It may with advantage have the form of an ellipsoid and be made of a material not liable to be attacked by sea water.

3 is a tube having at its lower end a flange 2 to which the sound seeker 1 is attached in a water-tight manner, and which tube serves as the axis of rotation for the sound seeker as well as forming a conduit through which conductors may be led, as hereinafter described.

When the apparatus is used on ships the tube 3 passes in a watertight manner through the bottom 4 of the ship, and to this bottom is fixed a bearing 5 in which the tube can rotate.

Figure 1A:
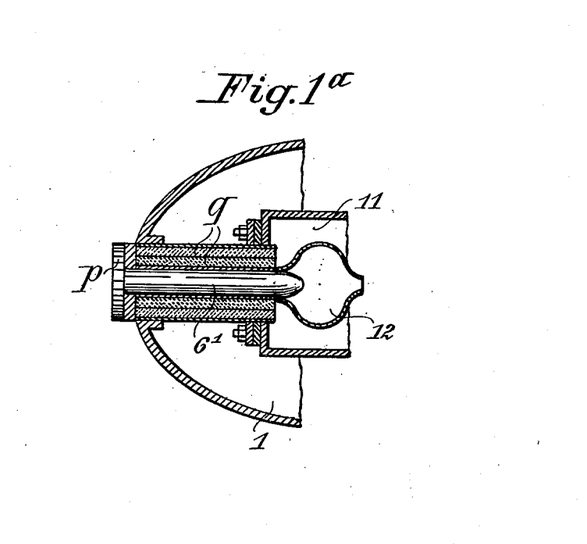

Projecting into the sound seeker 1 is an elastic metal tube or cylinder 6 the inner end of which is closed and the outer end of which is open to the outer water in which the device is located. Instead of the body 6 being tubular, as shown, it may in some cases be formed as a solid rod or cylinder made of elastic material. In this case the outer end of the solid metal cylinder 6', Fig. 1ª, is formed with a circular or other suitably shaped head $p$ which is packed or tightened against the ends of the several insulating layers $q$ by a washer of india-rubber or other material not liable to be attacked by sea water. In any case its external periphery is insulated from sound, as by an india-rubber sheath 7, a lead tube 8, an india-rubber tube 9 and finally separated from the surrounding space by a brass tube 10. The inner end of the tube 6, or equivalent, projects into a chamber 11 which contains the receiving devices proper, including a resonator 12 which is tightly mounted upon the inner end of the tube and which, if necessary, is tuned to a fixed note.

The outlet nozzle 13 of the resonator 12 projects into the sound horn 14 of a microphone 15, the conducting wires 16, 17, of which are carried upwardly through the tube 3.

The chamber 11 rests upon a sound-proof or sound damping foundation consisting, for example, of layers of india-rubber 18, wood 19, lead 20, and india-rubber 21; the microphone casing is likewise separated from the wall of the chamber by sound damping material, so that conduction of sound through the wall of the sound seeker 1 and the wall of the chamber 11 is minimized or prevented.

For the purpose of increasing the sensitiveness of the microphone 15 the chamber 11 may be filled with a gas under a higher pressure than the surrounding medium.

The tube 3 is rotated at a uniform speed in any suitable manner, say by means of bevel gear wheels 22, 23, from a shaft 24 driven by any appropriate motor, the arrangement being such that immediately the tube or the like 6 crosses the path of sound waves they enter it and are picked up by the receiver.

The receiving apparatus A is in direct communication with an indicating apparatus B situated above the water.

Figure 2:
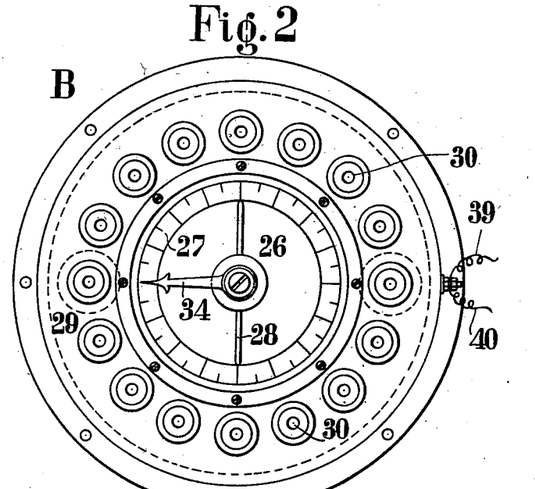
Fig. 2 shows the indicating apparatus in plan.

The upper portion of the tube 3, which in the example given is made separate from the remainder, and is suitably connected thereto, (although it may be made in one piece therewith,) passes through the casing 25 of the indicating apparatus, in the cover of which is fitted a ground glass disk 26 having division marks 27 thereon, see Fig. 2. A mark 28 running in the direction of a diameter of the graduated circular disk 26 indicates the position of the axis of the ship to which the apparatus is fitted, in a manner similar to that of a mariner's compass. The outer end of the upper part of the tube 3 is fitted with a pointer 34 which moves over the divisions 27 and is so arranged that it always indicates the position and direction of the tube 6 of the sound seeker 1.

A ring 29 of insulating material, Fig. 2, which surrounds the graduated disk 26 carries plug sockets 30 for a plug contact 31, the said sockets corresponding to the main divisions of the disk 26. The flexible conductor 32 connected to the plug contact 31 is connected with one conductor 33 of an electrical circuit the second conductor of which is connected to all the plug sockets 30. In this circuit, which may be supplied with a current of electricity from any desired source, are inserted indicators arranged in the usual way, and located at all those points of the ship, lighthouse, etc. where the indication is desired.

In the casing 25 are arranged glow lamps for the purpose of enabling the disk 26 to be illuminated from beneath.

Figure 3:
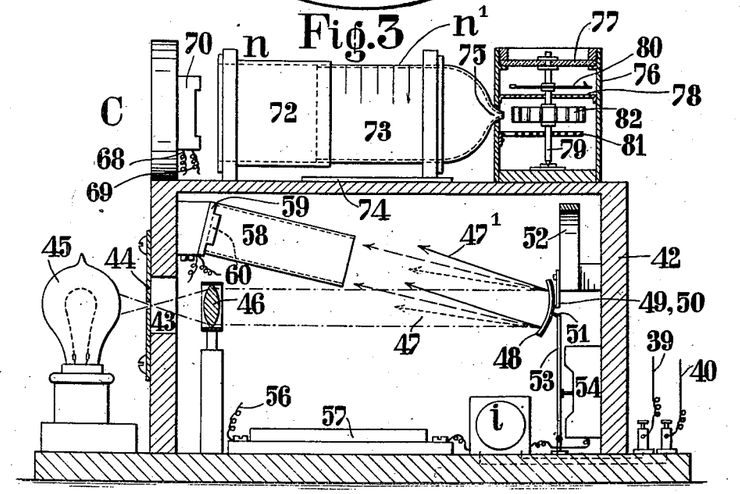
Fig. 3 shows, in vertical section, the apparatus for automatically giving the signal and determining the pitch.
Figure 4:
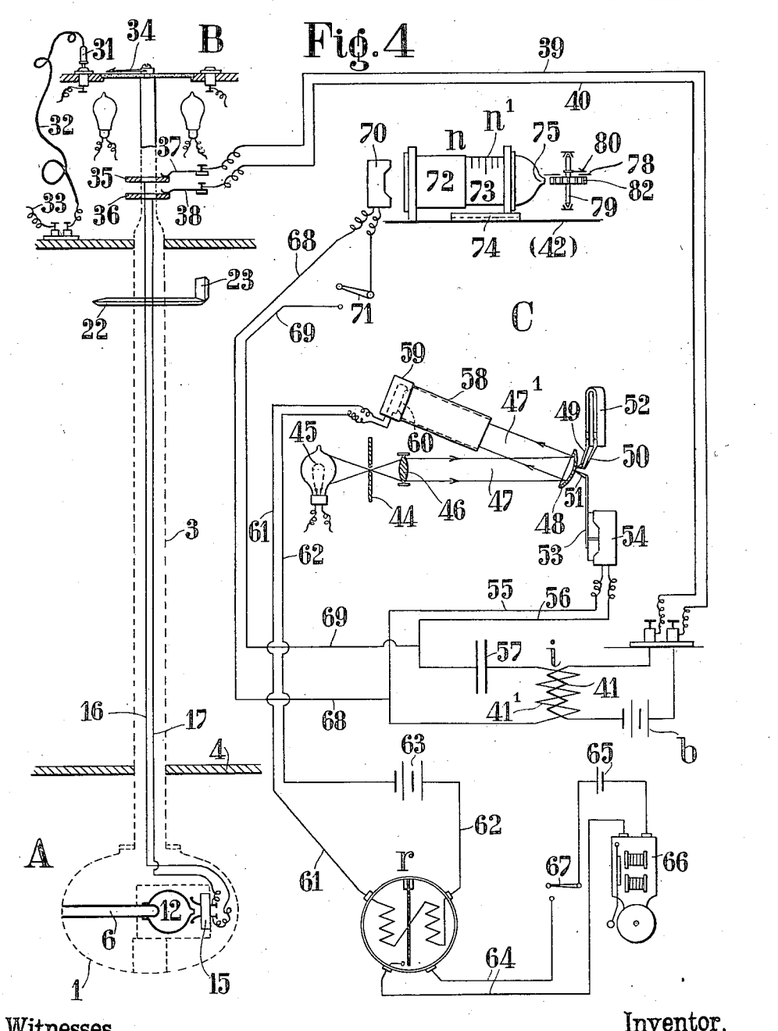
Fig. 4 shows the arrangement of electrical connections for all parts of the apparatus comprising the receiving device.

To enable the signal to be given automatically when sound waves enter and are received by the receiving apparatus A and the pitch of the sound waves or distance of the approaching or receding source of sound to be determined, the apparatus A is also electrically connected with an apparatus C, see Figs. 3 and 4. For the purpose of producing this electrical connection there are fixed upon the tube 3 two conducting disks 35 and 36, which are insulated therefrom and from each other, and are polished to a high degree of brilliancy, and which are connected to the conductors 14 and 17 leading from the microphone 15.

Rubbing contact springs 37 and 38 are arranged to bear upon the two disks 35 and 36, and these springs are connected by conductors 39 and 40 with the primary coil 41, see Fig. 4, of an induction apparatus $i$ which forms a constituent of the apparatus C and which is inclosed in a light-tight closed box 42, see Fig. 3.

In the circuit of the microphone 15 is included a battery $b$ see Fig. 4.

Figure 1B:
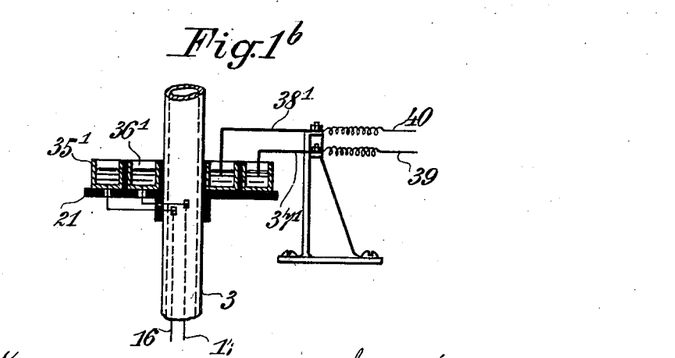

In place of the metal disks 35, 36, with the rubbing contacts 37, 38, contact stirrups may be employed which move in an annular mercury trough after the manner of Ampère's frames. This device consists of two concentrically arranged ring-shaped metal troughs, 35', 36', Fig. 1ᵇ, insulated from each other, the said troughs being secured to the tube 3 of the sound seeker 1 by means of a support or carrier 21 common to both of them, so that they will rotate with the tube 3. The troughs 35', 36' are filled with mercury and connected by means of the conducting wires 16, 17, to the microphone 15 of the sound seeker. Metallic contacts 37', 38', that dip into the mercury in the troughs, are connected to the conducting wires 39 and 40.

In the front wall of the light-tight box 42 is an opening 43, which, with the exception of a small orifice, is entirely covered by an opaque diaphragm 44. In front of the diaphragm and outside of the box is placed a glow lamp 45, and behind the diaphragm and inside the box is a bi-convex lens 46, one focus of which lies in the opening of the diaphragm 44, so that light rays falling upon the lens 46 emerge from the lens in the form of a parallel pencil of rays 47. The pencil of light rays 47 falls upon a small concave mirror 48, which is formed entirely of iron and is held by three magnetic points 49, 50 and 51, arranged triangularly a short distance from each other, see Figs. 3 and 4. Two of these points (49 and 50) are attached to the poles of a powerful magnet 52, while the third point 51 is mounted upon a small lever 53, which is connected to the diaphragm of a telephone 54, so that when the diaphragm vibrates, its movement to an increased extent is transmitted to the mirror 48, so that such mirror is caused to oscillate about the axis formed by the two other points 49 and 50.

The telephone 54 is electrically connected to the secondary coil 41' of the induction apparatus $i$, Fig. 4, by conductors 55, 56, and advantageously over one or more condensers 57.

When the mirror 48 moves, the pencil of rays 47' reflected therefrom falls through a tube 58 onto a selenium cell 60 arranged in the end or cover plate 59 of the tube and insulated therefrom, which cell is included in the circuit 61, 62, of a battery 63. The circuit 61, 62, also includes a polarized relay $r$ which serves to close a second circuit 64 which includes a bell battery 65, a bell 66 of the usual kind, and a hand switch 67.

In a shunt 68, 69 of the circuit 55, 56, is inserted a second telephone 70 which is mounted upon the cover of the box 42 and outside it. This shunt circuit 68, 69 may be made and broken by means of a hand switch 71, which may be so combined with the hand switch 67 that when the shunt circuit 68, 69 is closed the conductor 64 is broken, and vice versa.

Opposite the telephone 70 and on the cover of the box 42 is mounted a resonator $n$ which consists advantageously of two parts 72 and 73 adapted to slide telescopically, and of which one, 72, is stationary, while the other, 71, is movable along a guide 74, so that by increasing or diminishing the internal space of the resonator $n$ it can be adjusted for resonance within certain limits. The particular number of oscillations for each adjustment of the resonator may be read off from an empirically determined series of divisions $n'$ marked on the movable part 73 of the resonator. In order, however, to enable this resonator to be not only adjusted, but also its action to be seen, the outlet nozzle 75 thereof projects into a casing 76, Fig. 3, which is closed at the top by a transparent glass plate 77, and contains within it a disk 78 graduated with division marks in a circular row, over which moves a pointer 80 that is mounted upon a spindle 79 capable of easily rotating. To the spindle 79 is connected one end of a thin clock spring 81, which surrounds it, the other end of the spring being connected to the internal wall of the casing. Upon the spindle 79 is mounted a small fan wheel 82 which may with advantage be made of mica, and which is set in rotation by the air emerging from the nozzle 75 when the resonator $n$ responds. The greatest movement of the pointer 80 indicates the maximum intensity of the tone or resonance. The deflection of the pointer does not show the tone pitch but shows only the intensity of the tone. It is true that this intensity *per se*, may be due to different causes. But with one and the same resonator the maximum deflection of the pointer shows that during the shifting of the regulable resonator, resonance has finally taken place and that the tone at which this resonance has taken place is the proper one. Consequently the observer can deduce the intensity of the tone from the maximum deflection of the pointer 80.

The apparatus C also enables the speed to be determined with which a source of sound, which produces a tone of definite pitch, approaches toward or recedes from the observer.

The operation of the apparatus comprising the mechanism A, B and C is, assuming a ship to be the place of observation, as follows:—The receiver A, that is to say the sound seeker 1, while surrounded on all sides outside the hull of the ship by water, and accessible on all sides to sound waves, is slowly rotated about its axis 3, so that, assuming there is a sound proceeding from a distant source, at one point of its rotation the receiver will assume a position in which the sound tube or cylinder 6 of the receiver will extend directly in the direction of the distant source of sound. Such sound will then be at its greatest intensity relatively to the receiver and the microphone 15 will be then excited to its greatest extent. The fluctuations of current produced thereby are transmitted by the conductors 16, 17, the rubbing contacts 37, 38, or the mercury contacts replacing them, and the conductors 39, 40, to the primary coil 41 of the induction apparatus $i$. When the microphone responds an alternating current is induced in the secondary coil 41 of the induction apparatus, and the effect of this current is increased by the condenser 57, and acts upon the telephone 54 and sets its diaphragm to vibrating, such vibrations being transmitted to an increased extent through the lever 53 to the mirror 48. The vibrating mirror 48 throws the pencil of light 47' onto the selenium cell 60, which thereupon permits the current from the battery 63 to flow through the conductors 61, 62, and the relay r, which latter closes the circuit 64 of the ringing apparatus 66. If the ringing apparatus then be cut out by means of the switch 67 and the switch 71 be closed, the circuit 68, 69, of the telephone 70 will be completed, and the latter will produce sounds corresponding to the sound waves received. The pointer 34 connected to the sound seeker 1 slowly rotates with the sound seeker, and as soon as it is observed that the intensity of the sound is greatest at a particular position of the pointer this position is noted by the insertion of the plug contact socket 30 corresponding thereto. In this way, as hereinbefore described, the circuit 32, 33, is closed, and the position of the pointer is thereby signaled to all those points of the ship, such as steering house, torpedo room, etc., in which the indicators hereinbefore mentioned are arranged. If the telephone 70 reproduces a sound produced artificially from the distant source by a bell, a siren, a buzzer, or the like of a definite number of vibrations, and not a noise produced in a natural way, such, for example, as that of the ship's screw in motion, the speed of the approaching or receding source of sound can be easily calculated according to the well known Doppler principle, as when a source of sound, which produces a tone of a definite number of vibrations is approached, a higher tone is perceived, and when the source of sound recedes, a deeper one.

With the arrangements hitherto used, it was only possible to determine in which direction a source of sound was to be found, and at the utmost, whether this source of sound was approaching or receding from the observer.

By means of the apparatus hereinbefore described not only the direction but also the distance and the speed of a moving source of sound can be determined by calculation, as the necessary data are supplied by the apparatus described.

The calculation of the speed of the source of sound relatively to the observer is made by means of the well known Doppler principle. The source of sound in the present case is the submarine signaling apparatus of a ship or of a light-house or light-ship, as the case may be. For this purpose an apparatus is necessary, which allows exact determination of the increased number of vibrations, in case the source of sound is approaching, or of the diminished number of vibrations in case the source of sound is receding from the observer. This apparatus consists, as described, of a very sensitive telephone 70, Fig. 4, by means of which the tone collected by the sound detecting device A is reproduced. In the immediate vicinity of this telephone 70 is arranged an adjustable cylindrical resonator $n, n'$, on the adjustable part of which is provided a scale on which the different number of vibrations corresponding to tones in proximity to the normal tone emanating from the source of sound are marked. As it is sometimes difficult to rely upon the sense of hearing of the observer, an indication is provided, consisting of a small fan wheel 82 of a very small weight, preferably made of mica or other such material, the axis 79 of which turns on points. The axis carries a smaller pointer movable on a disk 78 which is fixed by means of a small clock spring. If the sound propagated in the sea water is reproduced in the telephone 70, the tone produced by the diaphragm of said telephone is reinforced by means of the resonator and the air vibrations turn the small fan wheel. The deviation of the wheel is greatest when the resonator is adjusted to resonance. On the adjustable part of the resonator the number of vibrations with which resonance is obtained may be read on the scale. If the number of vibrations of the tone received at the observation point is thus determined, the speed of the source of sound, relatively to the observation point may be ascertained.

If $N$ be the number of vibrations of the tone received at the observation point, and is indicated by the instrument, and if $n$ be the number of vibrations of the tone produced at the source of sound, which of course must be known to the observer, and $s$ the speed with which the source of sound approaches or recedes, and is unknown and to be determined, and $c$ the velocity with which the sound is propagated in water equal to 1435 per second, then the well known Doppler principle is expressed by the formula:

$$N = n\left(1 + \frac{s}{c}\right)$$

if the observer approaches the source of sound.

From this formula $s$ may be calculated $$s = \frac{c(N-n)}{n}$$

If, on the contrary, the observer recedes from the source of sound the signs are reversed and the Doppler formula is $$N = n\left(1 - \frac{s}{c}\right)$$

from which the speed $s$ $$s = \frac{c(n-N)}{n}$$

may be calculated.

If, however, the source of sound (a signaling ship) approaches the observer (supposed to be on a land station, or on another ship) the Doppler formula reads $$N = \frac{cn}{c-s}$$

from which the unknown speed $s$ $$s = \frac{c(N-n)}{N}$$

of the source of sound may be calculated.

In case the source of sound recedes from the observer, the Doppler formula is $$N = \frac{cn}{c+s}$$

and the speed $s$ is $$s = \frac{c(n-N)}{N}$$

As will be clear from the above statement, the speed can be immediately calculated by means of the indications given by the described apparatus if $n$, the number of vibrations of the tone produced by the submarine signaling device is known, as is the case with light-ships, or light-stations, or with ships having made a special arrangement to this effect. It is furthermore of advantage to write on the scale of the adjustable resonator not only the number of vibrations, but directly the speed per hour, as the limits between which the speed of a ship varies are very narrow, for a given type of ship. From this speed the type of ship in question may be immediately deduced, as the normal speed of different types has a determined value. For instance, a mail steamer has a speed of 10 knots per hour; a battle ship 18 knots; a cruiser or an express steamer 20 knots, and a torpedo vessel 30 knots. If by these means the velocity of the source of sound or of the observer is determined, the distance may be easily ascertained.

As the sea water is a good and uniform sound conductor, the range of audibility of the signals is a constant one for one and the same apparatus. If this range of audibility is known and is, say 50 km. it is clear that at the moment the annunciator device operates, the distance is equal to the radius of said range of efficiency.

If the moment at which the annunciator device operates has been noted, and the speed with which the source of sound or the observer moves has been calculated according to the Doppler principle, the distance at any given moment can be determined.

Let S be the maximum and constant range of audibility of the signals; D, the distance between the source of sound and the observer to be determined; $s$, the velocity of the ship; $t$, the time; then $$D = S - st$$

whereby the distance at every moment can be determined.

I claim:

1. A receiver for submarine signaling apparatus, comprising a sub-aqueous casing, a sound detecting element therein set into vibration by transmitted sound waves, a resonator coöperating therewith and producing air vibrations corresponding thereto, a microphone producing fluctuations of current corresponding to said air vibrations, means to annunciate the incoming of sound waves, a telephonic arrangement capable of reproducing the sound waves picked up by the detecting element, means to rotate the casing in the direction of the incoming sound waves, an indicating device indicating the direction in which the casing has been rotated and means to determine the number of vibrations of the transmitted sound waves.

2. A receiver for submarine signaling apparatus, comprising a sub-aqueous casing, a sound detecting tube closed at its inner end and insulated from the casing, a chamber contained in the casing into which the closed end of said tube projects, said chamber being sound insulated from the casing, a resonator mounted on the closed end of the tube coöperating therewith and producing air vibrations corresponding to the sound waves, a microphone producing fluctuations of current corresponding to said air vibrations, an annunciator device for indicating the incoming sound waves, a telephonic arrangement to reproduce the sound waves picked up by the detecting device, means to rotate the casing in the direction of the incoming sound waves, an indicator device indicating the direction in which the casing has been rotated, and means to determine the number of vibrations of the reproduced sound waves.

3. A receiver for submarine signaling apparatus, comprising a sub-aqueous casing, a sound detecting tube closed at its inner end and insulated from the casing, a chamber contained in said casing into which the closed end of said tube projects, said chamber filled with a gas under a pressure greater than that of the surrounding medium and sound insulated from the casing, a resonator mounted on the closed end of the tube, coöperating therewith and producing air vibrations corresponding to the sound waves, a microphone structure producing fluctuations of current corresponding to said air vibrations, an annunciator device indicating the incoming sound waves, telephonic means to reproduce the sound waves picked up by the detecting device, means to determine the number of vibrations of said sound waves, means to rotate the casing in the direction of the incoming sound waves, and an indicator to indicate the direction in which the casing has been rotated.

4. A receiver for submarine signaling apparatus, comprising a sub-aqueous casing, a sound detecting element therein set into vibration by transmitted sound waves, a resonator coöperating therewith and producing air vibrations corresponding thereto, a microphone producing fluctuations of current corresponding to said air vibrations, an annunciator for indicating the incoming sound waves picked up by the detecting element, means to indicate when said sound waves are of maximum intensity and the number of their vibrations, a tubular support for the casing, a gear mechanism to rotate the tubular support and the casing with a constant speed, and a hand connected with said rotating support indicating the position of the sound detecting element.

5. A receiver for submarine signaling apparatus, comprising a sub-aqueous casing, a sound detecting element therein set into vibration by transmitted sound waves, a resonator coöperating therewith and producing air vibrations corresponding thereto, a microphone producing fluctuations of current corresponding to said air vibrations, an annunciator indicating the incoming of sound waves, means to rotate the casing, an indicator to determine the direction in which the casing is rotated, telephonic means connected to said microphone and reproducing acoustical waves corresponding to the current fluctuations, an adjustable resonator in proximity to the telephone capable of being adjusted and tuned to resonance therewith, and means adjacent said resonator and acted upon by the vibrations therefrom to indicate the number of vibrations of the tone received and thereby determine the speed of the source of sound.

6. A receiver for submarine signaling apparatus, comprising a sub-aqueous casing, a sound detecting element therein set into vibration by transmitted sound waves, a resonator coöperating therewith and producing air vibrations corresponding thereto, a microphone producing fluctuations of current corresponding to said air vibrations, an annunciator indicating the incoming of sound waves, means to rotate the casing, an indicator to determine the direction of the sound waves, telephonic means connected to said microphone and reproducing acoustical waves corresponding to the current fluctuations, an adjustable resonator having an air outlet nozzle in proximity to the telephone capable of being adjusted and tuned to resonance therewith, a fan wheel pivotally mounted in proximity to the nozzle of said resonator, a spring to control the movement of said fan wheel, and an indicator thereon to indicate the degree of rotation of the wheel.

7. A receiver for submarine signaling apparatus, comprising a sub-aqueous casing, a sound detecting element therein set into vibration by transmitted sound waves, a resonator coöperating therewith and producing air vibrations corresponding thereto, a microphone, in coöperative relation therewith producing fluctuations of current corresponding to said air vibrations, telephonic means to reproduce the sound waves picked up by the detecting device, indicators, to determine the number of vibrations and the direction of said sound waves and a second telephonic means in parallel with the first to operate an annunciating device.

8. A receiver for submarine signaling apparatus, comprising a sub-aqueous casing, a sound detecting element therein set into vibration by transmitted sound waves, a resonator coöperating therewith and producing air vibrations corresponding thereto, a microphone in coöperative relation therewith and producing fluctuations of current corresponding to said air vibrations, telephonic means to reproduce the sound waves picked up by the detecting element, indicators to determine the number of vibrations and the direction of the incoming waves, a second telephonic means in parallel with the first, a circuit actuated by said telephonic means and an annunciator device arranged in said circuit to operate when sound waves enter the detecting element.

9. A receiver for submarine signaling apparatus, comprising a sub-aqueous casing, a sound detecting element therein set into vibration by the transmitted sound waves, a resonator coöperating therewith and producing air vibrations corresponding thereto, a microphone in coöperative relation therewith and producing fluctuations of current corresponding to said air vibrations, telephonic means to reproduce the sound waves picked up by the detecting element, indicators to determine the number of vibrations and the direction of said incoming waves, a second telephonic means in parallel with the first, a circuit independent of the first telephonic means including a selenium cell and a relay, a permanent magnet, a mirror supported by the poles of said magnet, a source of light projecting its light onto the mirror, means actuated by the oscillations of the diaphragm of the second telephonic means to move the mirror to project varying quantities of light onto the selenium cell, and a signal actuated by the aforesaid relay to operate when the sound waves are picked up.

10. A receiver for submarine signaling apparatus, comprising a sub-aqueous casing, a sound detecting element therein set into vibration by transmitted sound waves, a resonator coöperating therewith and producing air vibrations corresponding thereto, a microphone in coöperative relation therewith and producing fluctuations of current corresponding to said air vibrations, a telephonic means to reproduce the sound waves picked up by the detecting element, indicators to determine the pitch and the direction of said incoming waves, a telephone in parallel with the first, a circuit including a selenium cell and a relay, a permanent magnet, a metallic mirror magnetically held to said magnet, a lever arm operated by the diaphragm of the telephone, a source of light projecting its rays to said mirror, said mirror being positioned to reflect varying quantities of light to the cell to close said circuit by reason of the movement imparted to said lever arm by the diaphragm of the telephone, and a signal, such as a bell, actuated by the aforementioned relay to announce that sound waves have been picked up.

11. A receiver for submarine signaling apparatus, comprising in combination, a sub-aqueous receiving device including a timed resonator, means to rotate the same to determine the maximum intensity of the sound received and thereby the direction of said source of sound, means to convert the acoustical oscillations of said resonator into similar electrical oscillations, means for transforming said electrical oscillations into similar light vibrations, means to re-transform said light vibrations into reinforced electrical vibrations, means to produce acoustical vibrations from said retransformed electrical oscillations, and means to determine the pitch or number of vibrations of said latter acoustical vibrations.

12. A sub-aqueous signaling system comprising a sub-aqueous sound conductor responsive to a musical tone, a resonator connected thereto, and through which said tone is filtered, means actuated by said resonator responsive to said tone for producing electrical vibrations of the same frequency, and a receiving apparatus responsive to and operated by said synchronous electrical vibrations.

13. A sub-aqueous signaling system comprising a sub-aqueous sound conductor responsive to a musical tone, a resonator connected thereto and through which said tone is filtered, means actuated by said resonator responsive to said tone for producing electrical vibrations of the same period, a telephone operated by said electrical vibrations, a regulable resonator coöperating with said telephone whose adjustments for resonance are a measure of the increase or decrease of the number of vibrations of the tone received, and a scale to indicate the vibrations of the tone received and when the resonator is adjusted.

In testimony that I claim the foregoing as my invention, I have signed my name in presence of two subscribing witnesses.

Dr. JOSEF SCHIESSLER.

Witnesses:
 Josef Rubarchoe,
 August Fugger.